United States Patent
Young et al.

(10) Patent No.: US 9,682,534 B1
(45) Date of Patent: Jun. 20, 2017

(54) CHEMICAL RESISTANT WATERPROOFING MEMBRANES

(71) Applicants: Nathan E. Young, Ennis, TX (US); Steven H. Williams, Granville, OH (US); Roy E. Shaffer, Easton, PA (US); Brian M. Shaffer, Easton, PA (US)

(72) Inventors: Nathan E. Young, Ennis, TX (US); Steven H. Williams, Granville, OH (US); Roy E. Shaffer, Easton, PA (US); Brian M. Shaffer, Easton, PA (US)

(73) Assignee: Polyguard Products, Inc., Ennis, TX (US)

( * ) Notice: Subject to any disclaimer, the term of this patent is extended or adjusted under 35 U.S.C. 154(b) by 0 days.

(21) Appl. No.: 15/017,088

(22) Filed: Feb. 5, 2016

Related U.S. Application Data

(60) Provisional application No. 62/114,281, filed on Feb. 10, 2015.

(51) Int. Cl.
| | |
|---|---|
| *B32B 15/09* | (2006.01) |
| *B32B 5/02* | (2006.01) |
| *B32B 7/06* | (2006.01) |
| *B32B 15/20* | (2006.01) |
| *B32B 27/08* | (2006.01) |
| *B32B 27/06* | (2006.01) |
| *B32B 27/36* | (2006.01) |
| *B32B 27/30* | (2006.01) |
| *B32B 11/04* | (2006.01) |

(Continued)

(52) U.S. Cl.
CPC ............ *B32B 15/09* (2013.01); *B32B 5/02* (2013.01); *B32B 7/06* (2013.01); *B32B 7/12* (2013.01); *B32B 11/046* (2013.01); *B32B 11/10* (2013.01); *B32B 15/20* (2013.01); *B32B 27/06* (2013.01); *B32B 27/08* (2013.01); *B32B 27/30* (2013.01); *B32B 27/36* (2013.01); *B32B 2250/40* (2013.01); *B32B 2307/7246* (2013.01); *B32B 2307/7265* (2013.01); *B32B 2419/00* (2013.01); *B32B 2556/00* (2013.01); *B32B 2581/00* (2013.01)

(58) Field of Classification Search
CPC  B32B 15/09; B32B 15/20; B32B 5/02; B32B 7/06; B32B 7/12; B32B 11/10; B32B 27/06; B32B 27/08; B32B 27/30; B32B 27/36; B32B 2250/40; B32B 2307/7246; B32B 2307/7265; B32B 2419/00; B32B 2556/00; B32B 2581/00; E04D 5/00; E04D 5/04; E04D 5/06; E04D 5/10
See application file for complete search history.

(56) References Cited

U.S. PATENT DOCUMENTS

| | | |
|---|---|---|
| 7,488,523 B1 | 2/2009 | Muncaster et al. |
| 7,686,903 B2 | 3/2010 | Muncaster et al. |

(Continued)

*Primary Examiner* — Patricia L Nordmeyer
(74) *Attorney, Agent, or Firm* — Jack A. Kanz

(57) ABSTRACT

Chemical resistant waterproofing laminate membranes are formed by bonding an aluminum film or foil between two substantially vapor-impervious films with a chemical resistant bonding agent or adhesive such as cured liquid silicone rubber. The chemical resistant bonding agent resists delamination and deterioration of the laminate membrane caused by solvents and chemically reactive materials found in brownfield sites.

7 Claims, 3 Drawing Sheets

(51) Int. Cl.
 *B32B 11/10* (2006.01)
 *B32B 7/12* (2006.01)

(56) References Cited

U.S. PATENT DOCUMENTS

| | | | | |
|---|---|---|---|---|
| 9,156,972 B2 * | 10/2015 | Duguid | ............... | C08J 5/18 |
| 2014/0308494 A1 * | 10/2014 | Iwaya | ............... | B32B 27/26 |
| | | | | 428/216 |
| 2015/0064429 A1 * | 3/2015 | Iwaya | ............... | B32B 7/12 |
| | | | | 428/213 |

* cited by examiner

CHEMICAL RESISTANT WATERPROOFING MEMBRANES

This invention relates to membranes for forming a barrier against migration of moisture, insects, pesticides, vapors and toxic contaminants through cracks and joints in concrete slabs and foundation walls and for resisting formation or propagation of cracks in such slabs and walls. More particularly, it relates to waterproofing laminated membrane structures for use in brownfield applications to protect against intrusion of contaminants found in the surrounding and underlying soil.

The problems associated with water penetration and stress formation in concrete constructions have been addressed by compositions of various design which act as barriers to prevent or substantially retard migration of vapors therethrough. Most notable among such barrier structures are those disclosed in U.S. Pat. No. 7,488,523 and U.S. Pat. No. 7,686,903, the disclosures of which are incorporated herein by reference. However, vapor intrusion from hydrocarbon and other chemical contaminants presents a unique problem in re-development of properties known as "brownfield" sites.

Brownfield sites are generally described as areas contaminated by industrial or commercial use as locations for gasoline stations, dry cleaners, chemical storage and/or distribution facilities and heavy manufacturing plants. Such brownfield sites are generally contaminated with volatile organic compounds such as trichloroethylene, tetrachloroethylene, benzene, gasoline, other hydrocarbon wastes and various chemical solvents. These brownfield contaminants are not only environmental hazards, they are usually quite volatile, sometimes chemically reactive, and act as chemical and organic solvents. As a result, conventional laminated vapor barriers, particularly vapor barriers employing asphalt membranes and/or conventional adhesives, tend to delaminate, dissolve and/or otherwise deteriorate and become vapor pervious when subjected to brownfield vapors.

The present invention addresses the problems associated with re-development of brownfield sites by providing membranes which are essentially vapor-impervious and chemical resistant in the form of laminates of substantially vapor-impervious film bonded to opposites sides of an aluminum sheet, film or foil with a chemical resistant bonding agent or adhesive. The laminate membrane of plastic/aluminum/plastic provides a water and vapor barrier which does not contain chemically reactive layers or films and the like which are subject to attack by brownfield contaminants. To prevent delamination and deterioration of the laminate membrane, the plastic films are bonded to the aluminum with a chemical resistant bonding agent or adhesive. The laminate membrane thus provides a barrier which substantially prevents infiltration of water vapor as well as solvents and chemically reactive contaminants. Since the membranes are immune to chemical attack, delamination and deterioration caused by such contaminants is virtually eliminated. Other features and advantages of the invention will become more readily understood from the following detailed description taken in connection with the appended claims and attached drawing in which:

Figure 1:
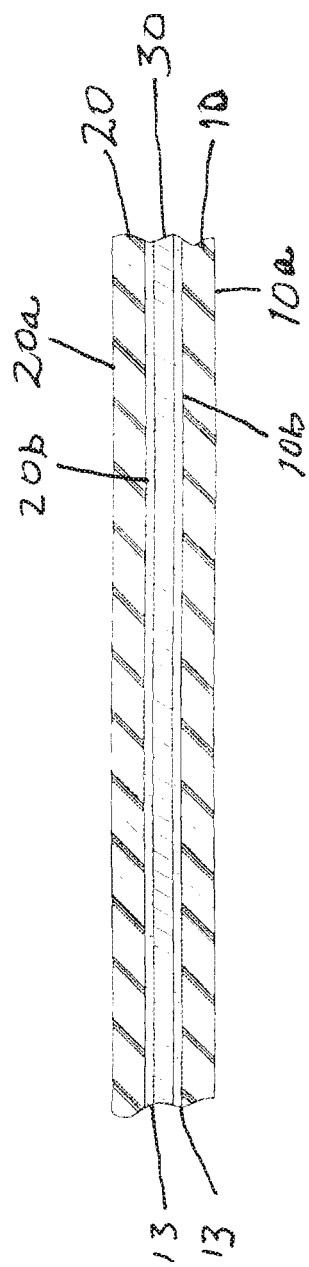
FIG. 1 is a sectional view of a preferred embodiment of the laminated vapor barrier membrane of the invention.

The above-described drawing is incorporated into and forms part of the specification to illustrate exemplary embodiments of the invention. Throughout the drawing like reference numerals designate corresponding elements. The figures are not to scale but are intended to disclose the inventive concepts by illustration. This drawing, together with the description herein, serves to explain the principles of the invention and is only for the purpose of illustrating preferred and alternative examples of how the invention can be made and used.

It will be recognized that the principles of the invention may be utilized and embodied in many and varied forms, and that various materials, component parts and arrangements of components may be employed in utilizing the invention. In order to demonstrate these principles, the invention is described herein by reference to specific preferred embodiments. The invention, however, is not limited to the specific forms illustrated and described in detail.

As illustrated in the drawing, the vapor barrier of the invention is a laminated structure comprising a substantially vapor-impervious film 10 having a first face 10a and an opposite second face 10b; a second substantially vapor-impervious film 20 having a first face 20a and a second face 20b; and an aluminum foil 30 secured between second face 10b of the first vapor-impervious film 10 and the second face 20b of the second vapor-impervious film 20 with a chemical resistant bonding agent or adhesive 13 as illustrated in FIG. 1.

In order to form an effective barrier to solvents and chemically reactive materials ordinarily found in brownfield sites, the laminate of the invention employs an aluminum film or foil sandwiched between two films of thermoplastic polymer resin such as polyethylene terephthalate (commonly known as and referred to herein as PET) or an equivalent material. The films 10, 20 may be as thick or thin as practical to provide both mechanical stability in the application for which they are used (thicker films may be required where unusual mechanical stress is anticipated) and provide substantial impermeability to the vapor contaminants found in the application site. PET film thicknesses from approximately 1.0 mil to approximately 5.0 mils have been found suitable for most applications. PET films of 2.0 mils are used in the preferred embodiment.

In order to prevent delamination of the PET/aluminum/PET laminate when exposed to chemically reactive and/or solvent contaminating materials, the PET films 10, 20 are bonded to the aluminum foil 30 with a chemically stable bonding adhesive 13 such as cured liquid silicone rubber or its equivalent. In the preferred embodiment, the vapor barrier laminate of the invention comprises a first 2.0 mil PET film 10 bonded to one face of a 1.0 mil aluminum foil 30 with a cured liquid silicone rubber layer 13 which is approximately 1.5 mils thick; and a second 2.0 mil PET film 20 bonded to the opposite face of the 1.0 mil aluminum foil with a cured liquid silicone rubber layer which is approximately 1.5 mils thick.

Figure 2:
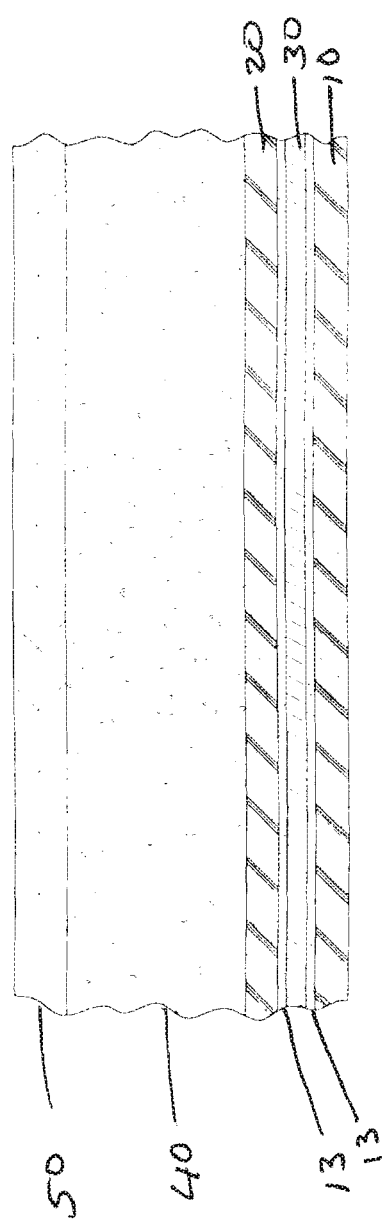
FIG. 2 is a sectional view of a composite sealing membrane employing the vapor barrier laminate of FIG. 1.

As illustrated in FIG. 2, the laminated vapor barrier structure of FIG. 1 may be combined with other waterproofing materials such as rubberized asphalt to form stress-relieving waterproof and vapor-impervious composite membranes and sealing structures. For example, as shown in FIG. 2 a layer of rubberized asphalt 40 is formed on the surface of second PET film 20 and a geotextile layer 50 or the like bonded to the asphalt layer 40 to form a stress-relieving waterproof and vapor-impervious sealing membrane which bonds directly to concrete.

Figure 3:
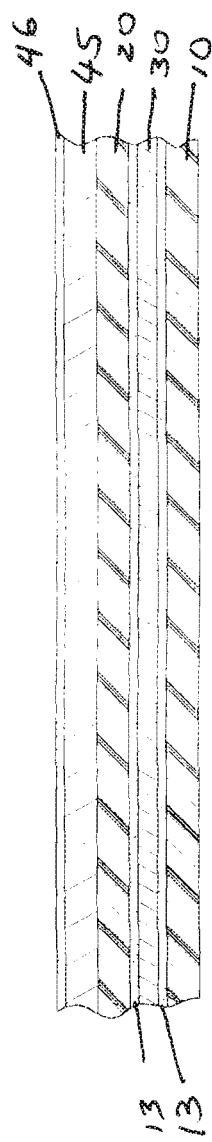
FIG. 3 is a sectional view of sealing tape employing the vapor barrier laminate of FIG. 1.

In the embodiment illustrated in FIG. 3 the laminated barrier structure of FIG. 1 is used to form a vapor-impervious sealing tape to cover joints, edges, overlaps, etc., by forming a layer 45 of vinyl adhesive on the exposed face of one of the PET films 10, 20. To protect the adhesive surface of vinyl adhesive layer 45 prior to use, the layer 45 is covered with a release film 46 which is removed as the adhesive film is applied.

The laminated vapor barriers of the invention have been found particularly useful in re-development of brownfield sites because chemically stable bonding agents such as cured liquid silicone rubber resist attack by solvents and chemically reactive materials found in such sites. Accordingly, the laminated vapor barriers of the invention resist chemical attacks which result in delamination and deterioration of the vapor barrier caused by such reactive materials.

While only exemplary embodiments of the invention have been illustrated and described in detail herein, it will be readily recognized that the principles of the invention may be used in various forms to provide chemically resistant waterproofing membranes for brownfield applications and the like. It will be appreciated that the invention is not limited to any particular dimensions, materials or arrangement of components. Various materials of construction and conventional components will be found suitable by those skilled in the art, and the arrangement, size and location of the various components may be varied as desired. It is to be understood, therefore, that even though numerous characteristics and advantages of the invention have been set forth in detail herein, the foregoing description, together with details of the structure and function of the various embodiments, is to be considered illustrative only. Various changes and modifications may be made in detail, especially in matters of shape, size and materials as well as arrangement and combination of parts, without departing from the spirit and scope of the invention as defined by the appended claims.

What is claimed is:

1. A vapor barrier laminate comprising:
   a) a first continuous vapor-impervious film having a first face and a second face;
   b) a second continuous vapor-impervious film having a first face and a second face; and
   c) a continuous aluminum foil bonded to said second face of said first continuous vapor-impervious film and said second face of said second continuous vapor-impervious film with an adhesive consisting essentially of cured liquid silicone rubber.

2. A vapor barrier laminate as defined in claim 1 wherein first continuous vapor-impervious film is a polyethylene terephthalate(PET) film and said second continuous vapor-impervious film is a polyethylene terephthalate(PET) film.

3. A vapor barrier laminate as defined in claim 2 wherein said first continuous polyethylene terephthalate(PET) film is approximately 1.0 mils to 5.0 mils thick and said second continuous polyethylene terephthalate(PET) film is approximately 1.0 mils to approximately 5.0 mils thick.

4. A vapor barrier laminate as defined in claim 1 wherein
   a) said first continuous vapor-impervious film is a polyethylene terephthalate(PET) film approximately 2.0 mils thick;
   b) said second continuous vapor-impervious film is a polyethylene terephthalate(PET) film approximately 2.0 mils thick; and
   c) said continuous aluminum foil is approximately 1.0 mil thick.

5. A composite waterproofing membrane comprising:
   a) a first continuous vapor-impervious film having a first face and a second face;
   b) a second continuous vapor-impervious film having a first face and a second face;
   c) a continuous aluminum foil bonded to said second face of said first continuous vapor-impervious film and said second face of said second continuous vapor-impervious film with an adhesive consisting essentially of cured liquid silicone rubber;
   d) a layer of rubberized asphalt continuously bonded to the first face of said second continuous vapor-impervious film; and
   e) a layer of geotextile continuously bonded to said layer of rubberized asphalt.

6. A sealing tape comprising:
   a) a first continuous vapor-impervious film having a first face and a second face;
   b) a second continuous vapor-impervious film having a first face and a second face;
   c) a continuous aluminum foil bonded to said second face of said first continuous vapor-impervious film and said second face of said second continuous vapor-impervious film with an adhesive consisting essentially of cured liquid silicone rubber;
   d) a layer of self-adhesive vinyl having a first side continuously bonded to the first face of said second continuous vapor-impervious film and an exposed outer face; and
   e) a removable release film affixed adjacent said exposed outer face of said self-adhesive vinyl layer.

7. A sealing tape as defined in claim 6 wherein said first continuous vapor-impervious film is a polyethylene terephthalate (PET) film and said second continuous vapor-impervious film is a polyethylene terephthalate (PET) film.

* * * * *